(12) United States Patent
Wetzer et al.

(10) Patent No.: US 7,440,906 B1
(45) Date of Patent: Oct. 21, 2008

(54) IDENTIFICATION, CATEGORIZATION, AND INTEGRATION OF UNPLANNED MAINTENANCE, REPAIR AND OVERHAUL WORK ON MECHANICAL EQUIPMENT

(75) Inventors: Michael Wetzer, Redwood City, CA (US); Gary R. Garrow, Burbank, CA (US); David P. West, II, Newnan, GA (US); Patrick E. Weir, San Francisco, CA (US); Gary Ashby, Kent (GB); Charles P. Newton, III, Rock Hill, SC (US)

(73) Assignee: Accenture Global Services GmbH, Schauffhausen (CH)

( * ) Notice: Subject to any disclaimer, the term of this patent is extended or adjusted under 35 U.S.C. 154(b) by 745 days.

(21) Appl. No.: 09/946,095

(22) Filed: Sep. 4, 2001

(51) Int. Cl.
*G06Q 90/00* (2006.01)
(52) U.S. Cl. .................................. 705/8; 705/7; 705/10
(58) Field of Classification Search ....................... 705/8
See application file for complete search history.

(56) References Cited

U.S. PATENT DOCUMENTS

| | | | |
|---|---|---|---|
| 4,744,026 A | 5/1988 | Vanderbei | |
| 4,908,775 A | 3/1990 | Palusamy et al. | |
| 5,216,612 A | 6/1993 | Cornett et al. | |
| 5,295,065 A | 3/1994 | Chapman et al. | |
| 5,311,562 A | 5/1994 | Palusamy et al. | |
| 5,331,579 A | 7/1994 | Maguire, Jr. et al. | |
| 5,343,388 A | 8/1994 | Wedelin | |
| 5,434,775 A | 7/1995 | Sims et al. | |
| 5,596,507 A | 1/1997 | Jones et al. | |
| 5,630,070 A | 5/1997 | Dietrich et al. | |
| 5,710,723 A | 1/1998 | Hoth et al. | |
| 5,737,728 A | 4/1998 | Sisley et al. | |
| 5,754,451 A | 5/1998 | Williams | |
| 5,778,381 A | 7/1998 | Sandifer | |
| 5,826,236 A | 10/1998 | Narimatsu et al. | |
| 5,877,961 A | 3/1999 | Moore | |

(Continued)

FOREIGN PATENT DOCUMENTS

EP    0 639 815 A2    8/1994

(Continued)

OTHER PUBLICATIONS

Knotts, Robert M. H., Civil Aircraft Maintenance and Support; Fault Diagnosis from a Business Perspective, Journal of Quality in Maintenance Engineering, vol. 5 No. 4, 1999, pp. 335-347, [Dialog: File 15].*

(Continued)

*Primary Examiner*—Andre Boyce
(74) *Attorney, Agent, or Firm*—Brinks Hofer Gilson & Lione (57) ABSTRACT

A method for managing maintenance of equipment includes identifying a planned MRO task and a first set of components associated with the task and determining a set of probabilities associated with a second set of components and indicating that the second set of components will require maintenance during the planned MRO task. The method further includes developing a plan for maintenance of individual items in the second set of components and, upon discovering a need for maintenance of at least one item of the second set of components, accessing the plan and integrating it with a plan of planned MRO tasks for the equipment.

20 Claims, 4 Drawing Sheets

U.S. PATENT DOCUMENTS

| | | |
|---|---|---|
| 5,890,133 A | 3/1999 | Ernst |
| 5,897,629 A | 4/1999 | Shinagawa et al. |
| 5,918,219 A | 6/1999 | Isherwood |
| 5,920,846 A | 7/1999 | Storch et al. |
| 5,931,878 A | 8/1999 | Chapin, Jr. |
| 5,963,911 A | 10/1999 | Walker et al. |
| 5,970,437 A * | 10/1999 | Gorman et al. ............ 702/184 |
| 5,970,466 A | 10/1999 | Detjen et al. |
| 5,987,474 A | 11/1999 | Sandifer |
| 5,995,915 A | 11/1999 | Reed et al. |
| 6,006,171 A | 12/1999 | Vines et al. |
| 6,014,633 A | 1/2000 | DeBusk et al. |
| 6,038,539 A | 3/2000 | Maruyama et al. |
| 6,067,486 A | 5/2000 | Aragones et al. |
| 6,078,912 A | 6/2000 | Buerger et al. |
| 6,101,481 A | 8/2000 | Miller |
| 6,110,214 A | 8/2000 | Klimasauskas |
| 6,128,543 A | 10/2000 | Hitchner |
| 6,154,735 A | 11/2000 | Crone |
| 6,175,934 B1 | 1/2001 | Hershey et al. |
| 6,192,325 B1 | 2/2001 | Piety et al. |
| 6,208,955 B1 | 3/2001 | Provan et al. |
| 6,219,654 B1 | 4/2001 | Ruffin |
| 6,230,200 B1 | 5/2001 | Forecast et al. |
| 6,230,480 B1 | 5/2001 | Rollins, III |
| 6,292,806 B1 | 9/2001 | Sandifer |
| 6,308,162 B1 | 10/2001 | Oulmet et al. |
| 6,321,207 B1 | 11/2001 | Ye |
| 6,349,274 B1 | 2/2002 | Kay et al. |
| 6,418,361 B2 | 7/2002 | Sinex |
| 6,496,814 B1 | 12/2002 | Busche |
| 6,571,158 B2 | 5/2003 | Sinex |
| 6,580,982 B2 | 6/2003 | Sinex |
| 6,594,786 B1 | 7/2003 | Connelly et al. |
| 6,598,940 B2 | 7/2003 | Sinex |
| 6,606,546 B2 | 8/2003 | Sinex |
| 6,671,593 B2 | 12/2003 | Sinex |
| 6,678,716 B1 | 1/2004 | Prosanti, Jr. et al. |
| 6,684,136 B2 | 1/2004 | Sinex |
| 6,691,006 B2 | 2/2004 | Sinex |
| 6,691,064 B2 * | 2/2004 | Vroman ............ 702/183 |
| 6,691,244 B1 | 2/2004 | Kampe et al. |
| 6,701,298 B1 | 3/2004 | Jutsen |
| 6,714,829 B1 | 3/2004 | Wong |
| 6,732,028 B2 | 5/2004 | Vanstory |
| 6,738,748 B2 | 5/2004 | Wetzer |
| 6,801,820 B1 | 10/2004 | Lilly et al. |
| 6,820,038 B1 | 11/2004 | Wetzer et al. |
| 6,980,959 B1 | 12/2005 | Garrow et al. |
| 7,031,941 B2 | 4/2006 | Garrow et al. |
| 7,058,587 B1 | 6/2006 | Horne |
| 7,085,766 B2 * | 8/2006 | Keith, Jr. ............ 707/101 |
| 7,124,059 B2 | 10/2006 | Wetzer et al. |
| 7,231,374 B1 | 6/2007 | Balasinski |
| 2001/0053991 A1 | 12/2001 | Bonabeau |
| 2002/0007225 A1 | 1/2002 | Costello et al. |
| 2002/0010615 A1 | 1/2002 | Jacobs |
| 2002/0022984 A1* | 2/2002 | Daniel et al. ............ 705/8 |
| 2002/0072988 A1 | 6/2002 | Aram |
| 2002/0143564 A1 | 10/2002 | Webb et al. |
| 2002/0156692 A1 | 10/2002 | Squeglia et al. |
| 2003/0009253 A1 | 1/2003 | McIntyre et al. |
| 2003/0036939 A1* | 2/2003 | Flores et al. ............ 705/8 |
| 2003/0050824 A1 | 3/2003 | Suermondt et al. |
| 2003/0216888 A1* | 11/2003 | Ridolfo ............ 702/181 |
| 2004/0019577 A1* | 1/2004 | Abdel-Malek et al. ......... 707/1 |
| 2005/0187838 A1 | 8/2005 | Squeglia et al. |
| 2007/0203779 A1 | 8/2007 | Tveit et al. |

FOREIGN PATENT DOCUMENTS

| | | |
|---|---|---|
| EP | 1162557 A | 12/2001 |
| JP | 60165325 | 2/1984 |
| JP | 62026510 A | 2/1987 |
| JP | 02065201 | 8/1988 |
| JP | 02127952 | 11/1988 |
| JP | 03264250 A | 11/1991 |
| JP | 04025350 A | 1/1992 |
| JP | 07203120 | 12/1993 |
| JP | 08180654 | 12/1994 |
| JP | 8-263546 | 10/1996 |
| JP | 9-050599 | 2/1997 |
| JP | 07060449 | 2/1997 |
| JP | 9034946 | 2/1997 |
| JP | 10298351 | 4/1997 |
| JP | 09212555 A | 8/1997 |
| JP | 10-27200 | 1/1998 |
| JP | 11210106 | 1/1998 |
| JP | 2000015587 | 6/1998 |
| JP | 2000-123089 | 4/2000 |
| JP | 2000124094 | 4/2000 |
| JP | 2001-34324 | 2/2001 |
| JP | 2001092520 | 4/2001 |
| JP | 2001-209676 | 8/2001 |
| WO | WO 98/44439 | 10/1998 |
| WO | WO 01/15001 | 3/2001 |

OTHER PUBLICATIONS

McQueen, G., "Aircraft Maintenance," *Industrial Maintenance & Plant Operations*, Aug. 1996.

MIL-HDBK-61, Military Handbook, "Configuration Management Guidance," Sep. 1997.

IBM Technical Disclosure Bulletin, Computer-Aided Process Planning, v. 37, n.4B, p. 605-608, [online], [retrieved Sep. 11, 2005 via EAST] (3 pages).

Swanson, Computerized maintenance management systems: a study of system design, Production and Inventory Management Journal, 2$^{nd}$ Qtr 1997, v.38, n.2, p. 11-15 (5 pages).

Dilger, Asset management, maintenance redefined, Manufacturing Systems, Jul. 1997, v.15, n.7, p. 122-128, [on-line], [retrieved Sep. 8, 2005 via Dialog file 624.01167091] (4 pages).

Koch, Manage data to tame the maintenance tiger, Electrical World Mar./Apr. 2001, v.215, n.2, p. 37. [on-line], retrieved Sep. 8, 2005 via Dialog file 624:01167091] (4 pages).

Anonymous, maintenance mania, Manufacturing Systems, May 1998, v.16, n.5, p. 80-84, [on-line], [retrieved Sep. 8, 2005 via Dialog file 15:01650138] (4 pages).

Fulcher, ERP and PDM equals productivity, manufacturing systems, Aug. 1998, v.16, n.8, p. 36-40, [online], [retrieved Sep. 8, 2005 via Dialog file 15:01690148] (5 pages).

Al-Sultan, Maintenance control via mathematical programming, Journal of Quality in Maintenance Engineering, 1995, v 1, n.3, p. 36-46, [online], [retrieved Sep. 8, 2005 via Dialog file 15:02271208] (9 pages).

Avery, Datastream introduces new online buy system for MRO, Purchasing, Nov. 18, 1999, v.127, n.122 (1 page).

Szwedo, Increasing productivity in an AS/RS maintenance department, Production and Inventory Management Journal, 1$^{st}$ Qtr 1995, v.36, n.1, p. 76-81 (6 pages).

Ho, An on-line system for aircraft maintenance, Journal of Systems Management, Sep. 1994, v.45, n.9, p. 24-27 (4 pages).

Anonymous, Bell & Howell offers maintenance kits, today, Feb. 2000, v.22, n.1, p. 10 (1 page).

Kroenke, David M. Database Processing: Fundamentals, Design and Implementation, 1999 Prentice-Hall; NJ. pp. 3-23.

International Search Report dated Oct. 4, 2002, for corresponding international application PCT/US02/09303.

Written Opinion dated Mar. 5, 2003, for corresponding international application PCT/US02/09303.

International Search Report dated Dec. 28, 2001, for corresponding international application PCT/US01/32154.

International Search Report dated Jan. 2, 2002, for corresponding international application PCT/US01/32576.

Manny Gdalevitch, "MSG-3, The Intelligent Maintenance", Nov. 2000, Aircraft Maintenance Technology, pp. 1-6, retrieved from the web at: http://amtonline.com/publication/article.jsp?pubId=1&id=1039.

Parker A. Grant and James F. Mazeski; "Turbine Engine Maintenance-Back to Basics", Aircraft Maintenance Technology, Nov. 2000, retrieved from the web at: http://amtonline.com/publication/article.jsp?pubid=1&id=1035.

Harry Fenton, "Magnetos Under PressureMagnetos Under Pressure", Jul. 2000, retrieved from the web at: http://amtonline.com/publication/article.jsp?pubId=1&id=992.

Jack Hessburg, "Scheduled Maintenance Tasks: Working through the development process with the Maintenance Steering Group", Mar. 2000, retrieved from the web at: http://amtonline.com/publication/article.jsp?pubId=1&id=950.

Bill de Decker, "Save on Maintenance Costs", Mar. 2000, retrieved from the web at: http://amtonline.com/publication/article.jsp?pubid=1&id=952.

Michael M. DiMauro, "Preventive Maintenance for Thrust Reversers", Mar. 2000, retrieved from the web at: http://amtonline.com/publication/article.jsp?pubid=1 & id=947.

Airman 2000: simplifying and optimizing aircraft maintenance, pp. 1-3, retrieved from the web at: http://www.content.airbusworld.convsites/Customerservices/html/acrobattfast29 pO2 07 airman.pdf The prosecution history of U.S. Appl. No. 09/825,633 shown in the attached Patent Application Retrieval file wrapper document list, printed Mar. 7, 2008, including each substantive office action and applicant response.

The prosecution history of U.S. Appl. No. 09/960,793 shown in the attached Patent Application Retrieval file wrapper document list, printed Mar. 7, 2008, including each substantive office action and applicant response.

The prosecution history of U.S. Appl. No. 09/947,136 shown in the attached Patent Application Retrieval file wrapper document list, printed Mar. 7, 2008, including each substantive office action and applicant response.

The prosecution history of U.S. Appl. No. 09/947,024 shown in the attached Patent Application Retrieval file wrapper document list, printed Mar. 7, 2008, including each substantive office action and applicant response.

The prosecution history of U.S. Appl. No. 09/946,894 shown in the attached Patent Application Retrieval file wrapper document list, printed Mar. 7, 2008, including each substantive office action and applicant response.

The prosecution history of U.S. Appl. No. 09/946,093 shown in the attached Patent Application Retrieval file wrapper document list, printed Mar. 7, 2008, including each substantive office action and applicant response.

The prosecution history of U.S. Appl. No. 09/946,032 shown in the attached Patent Application Retrieval file wrapper document list, printed Mar. 7, 2008, including each substantive office action and applicant response.

The prosecution history of U.S. Appl. No. 09/946,160 shown in the attached Patent Application Retrieval file wrapper document list, printed Mar. 7, 2008, including each substantive office action and applicant response.

The prosecution history of U.S. Appl. No. 10/799,914 shown in the attached Patent Application Retrieval file wrapper document list, printed Mar. 7, 2008, including each substantive office action and applicant response.

The prosecution history of U.S. Appl. No. 09/947,157 shown in the attached Patent Application Retrieval file wrapper document list, printed Apr. 2, 2008, including each substantive office action and applicant response.

Vijayan, Jaikumar, "Fault-Tolerant Computing", Computerworld vol. 34, 1 page Issue 47, Mar./Apr. 2000.

Morris Cohen et al., "Optimizer: IBM's Multi-Echelon Inventory System for Managing Service Logistics", The Institute of Management Sciences, pp. 65-82, Jan. to Feb. 1990.

* cited by examiner

IDENTIFICATION, CATEGORIZATION, AND INTEGRATION OF UNPLANNED MAINTENANCE, REPAIR AND OVERHAUL WORK ON MECHANICAL EQUIPMENT

CROSS REFERENCE TO RELATED APPLICATIONS

This application is related to application Ser. No. 09/946,093, entitled "Maintenance, Repair And Overhaul Management," and application Ser. No. 09/946,032, entitled "Planning, Scheduling, Allocation of MRO Resources," both of which were filed on Sep. 4, 2001 and commonly assigned to the assignee of the present application.

BACKGROUND

This application relates generally to managing maintenance of equipment. More particularly, this invention relates to identification, categorization, and integration of unplanned maintenance repair and overhaul (MRO) work in an MRO business organization.

A number of businesses focus their operations on the maintenance, repair or overhaul of complex equipment. Aircraft fleet and truck fleet maintenance are two commonly known businesses in this arena. In addition other business that have to maintain expensive complex machinery and other capital equipment such as fully automated manufacturing plants also require the maintenance, repair and/or overhaul of their equipment to keep the business operations running profitably.

Historically, within MRO business organizations, resource planning has been performed as a product of resource availability within a very near term time window, usually within weeks. The specific scheduling activity of MRO tasks usually is the product of responding to emergencies and matters of necessities to keep a particular end item, or a piece of equipment, in service. The result is that maintenance schedules often serve as general guidelines with critical resources being poorly allocated. Those resources typically need to be continually swapped and reallocated in an ad hoc manner to meet the emergency maintenance needs. This informality often results in both excessive equipment down times and excessive cost of maintenance.

Scheduling systems have been developed to permit the performance of MRO tasks to a predefined schedule and support that schedule with the correct components, raw materials, information, skilled or certified personnel, tooling and facilities. The ability to reliably schedule MRO work is important to an MRO business and its customers. The predictability of schedule performance is one of the most difficult issues facing MRO management. Such predictability is the foundation of both financial and technical success for an MRO business.

In the MRO environment, and especially while performing maintenance on more technically complex end items, the discovery of unplanned work (also known as "above and beyond", or "emergent" work) during the execution of the original maintenance plan is problematic. Such unplanned maintenance work increases the level of difficulty of the effort, makes the supporting of the original plan much less efficient, and can create chaos within the work schedule. Of all of the tasks which must be performed once an item of unplanned work is discovered, the actual identification and categorization of the work content for that unplanned item is one of the most crucial factors in successfully dealing with the unplanned work and the schedule.

Historically, the identification and categorization of such unplanned work has been manual in nature, open to great latitude in description (both as to accuracy and detail of the description), and time consuming for the mechanic or technician. Additionally, the time spent performing the essentially clerical task of identifying and categorizing the work is time lost from the execution of the already planned maintenance. This is a source of inefficiency and wasted resources.

In those industries subject to extensive government regulation, the degree of detail required in the description of such tasks compounds the problem further. For example, commercial and military aircraft MRO operations must be scheduled and logged in accordance with government requirements. Disruptions to the schedule must also be logged and accounted. Manual records must be maintained for subsequent verification by regulators. The processing of these manual records, the reaction of the full business to the content of those records (purchasing of components; assignments of personnel; etc.), and the degree of human error represented by those records has made them a serious roadblock to the improvement of the MRO businesses.

Further difficulty occurs when attempts are made to integrate newly identified and categorized work with a pre-existing maintenance plan. This difficulty arises in reference to the placement and sequencing of the discovered work within the pre-existing plan. This difficulty also arises in reference to the availability of the required components, information, tooling, and certified personnel to perform the tasks. A general rule of thumb is that over 50% of the tasks accomplished by an MRO activity were not part of the original workplan, and well over 60% of the time required to perform the tasks (and the cost associated with the maintenance business) are originally unplanned, meaning discovered during planned work execution.

Accordingly, there is a need for improved methods and apparatus for identification, categorization and integration of unplanned MRO work in a schedule of planned work.

BRIEF SUMMARY

By way of introduction only, the present invention provides in one embodiment a method for managing maintenance of equipment. The method includes identifying a planned MRO task and a first set of components associated with the task and determining a set of probabilities associated with a second set of components and indicating that the second set of components will require maintenance during the planned MRO task. The method further includes developing a plan for maintenance of individual items in the second set of components and, upon discovering a need for maintenance of at least one item of the second set of components, accessing the plan and integrating it with a plan of planned MRO tasks for the equipment.

In another embodiment, the invention further provides a method for managing maintenance of equipment. The method includes discovering a component of the equipment requiring unplanned maintenance and identifying a location of the component. The method further includes identifying a category of work required for the unplanned maintenance, identifying a task description in the category of work to be performed, identifying a data code on the component, obtaining information from one or more databases associated with maintenance of said equipment, and scheduling the unplanned maintenance into a schedule of planned maintenance based on the information obtained from the one or more databases.

In yet another embodiment, the invention further provides a system for managing the maintenance of equipment by integrating planned maintenance with unplanned maintenance. The system includes a network user interface in communication with a network and at least one storage device in communication with the network, the storage device being configured to store data from a plurality of databases. These databases in one embodiment include a Planned Work Probable Findings database including data of probability that, during planned maintenance of a first component, a second component will be identified as requiring unplanned maintenance, a Geography Definition database including data defining physical zones within which a repair task may be performed on a piece of equipment, a Planned Work Geography Locator database including data associating a planned MRO task to a physical zone, and a Component Tracking database including data selected from one or more of part numbers, component serial numbers and tracking numbers, the Component Tracking database being linked to a configuration database; and a scheduler for scheduling maintenance for a plurality of maintenance time periods; wherein the network user interface is configured to provide access to data from one or more database to describe a MRO task for a component of the equipment discovered to require maintenance; and wherein said scheduler includes logic to integrate the maintenance of the second component into a maintenance plan for said maintenance in a selected time period.

In yet another embodiment, the invention further provides a method for managing maintenance of equipment. The method includes identifying a planned MRO task of the equipment and based on location of the planned MRO task, retrieving from a memory probable MRO tasks associated with the planned MRO task.

In yet another embodiment, the invention further provides a computer readable equipment maintenance database storage medium. The storage medium includes first data defining planned maintenance items for equipment and second data defining probable maintenance items for the equipment. The second data is associated with the first data by geographic data for the equipment.

In yet another embodiment, the invention further provides a method for forming an equipment maintenance database. The method includes identifying a planned MRO task for equipment and identifying one or more geographical areas of the equipment associated with completion of the planned MRO task. The method further includes determining unplanned MRO tasks associated with the one or more geographical areas and, in a database, storing first data related to the planned MRO task, storing second data related to the unplanned MRO tasks, and associating the first data and the second data by data related to the one or more geographical areas of the equipment.

The foregoing summary has been provided only by way of introduction. Nothing in this section should be taken as a limitation on the following claims, which define the scope of the invention.

DETAILED DESCRIPTION OF THE PRESENTLY PREFERRED EMBODIMENTS

Figure 1:
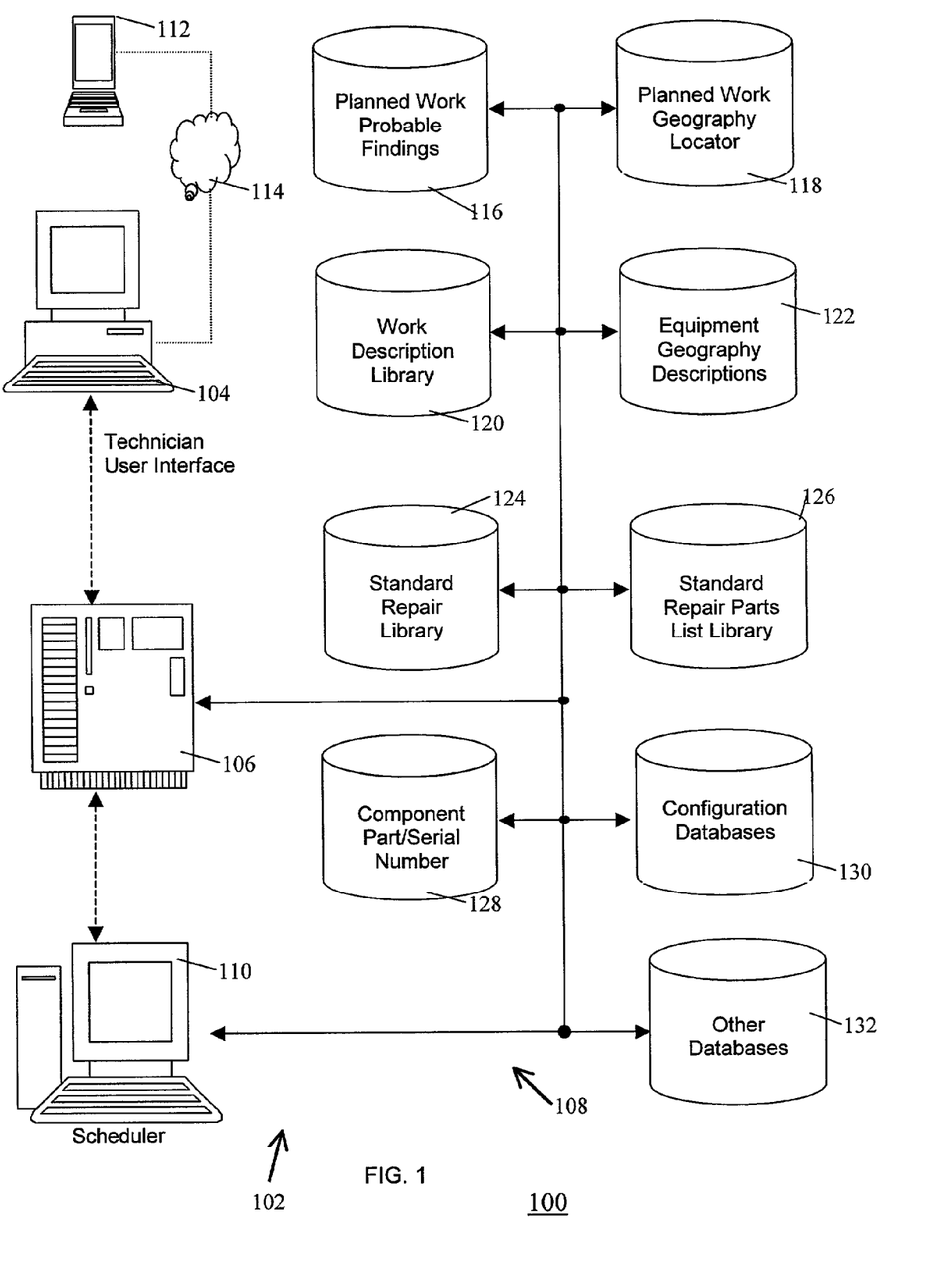
FIG. 1 is a block diagram of a system for managing maintenance of equipment.

Referring now to the drawing, FIG. 1 is a block diagram of a system 100 for managing maintenance of equipment. As used herein, equipment refers to a machine or machinery that is formed of a defined arrangement of multiple components. A component means a component, a sub-component, an assembly, a system, or any other part of an item of equipment. A component may include, but need not include, one or more sub-components. An assembly may comprise a group of components that are integrated together. A material refers to raw material, a consumable, a component, a provision, or other equipment-related resources related to the performance of a maintenance activity. A maintenance activity or a maintenance task refers to at least one of maintenance, repair and overhaul of an item of equipment or a component of the item.

A component is not limited to mechanical elements and is broadly defined to include an electrical assembly, an electrical system, an electronic system, a computer controller, software, hydraulics, plumbing, and the like. Mechanical equipment includes heavy equipment and capital intensive equipment that is movable or fixed. Mobile mechanical equipment includes airplanes, buses, locomotives, ships, cranes, heavy trucks, earth moving equipment, and the like. Fixed mechanical equipment includes electrical power generators, industrial presses, manufacturing equipment or the like.

The system 100 forms a system for managing the maintenance of equipment by integrating planned maintenance of the equipment with unplanned maintenance for the equipment. In one exemplary embodiment described herein, the system 100 may be used in conjunction with a maintenance, repair and overhaul (MRO) system for performing MRO work on equipment. In another exemplary embodiment, the system 100 is used by a provider of MRO services for airplanes such as military and commercial airplanes. However, the system is not so limited and may be used in conjunction with any type of equipment or system.

The system 100 includes a computer network 102, a user interface 104, a server 106, a storage device 108 and a scheduler 110. The network 102 may be any suitable data communications network, such as a local area network, wireless network, etc. Many networking standards have been developed and may be adapted for application as shown in FIG. 1 and described herein.

The user interface 104 is in communication with the network 102 and provides access to data and applications located remotely on the network 102. In the illustrative embodiment, the user interface 104 is embodied as a personal computer. In other embodiments, different types of data entry and data communication devices may be used. For example, in one alternative embodiment shown in FIG. 1, a wearable data communication device 112 is in communication with the user interface 104 by means of a wireless network 114. The wearable communication device 112 forms a wireless data entry device in communication with other components of the network 102. The wearable communication device 112 permits an operator such as a technician or mechanic to access remote locations of equipment undergoing MRO work while remaining in data communication with the network 102 but without the inconvenience of trailing data cables. Other types of data entry devices are known and may be adapted for use in the system 100.

The server 106 provides a process workflow and messaging device for the system 100. The server 106 is in communication with the user interface 104, the storage device 108 and the scheduler 110. The server 106 may also provide data communication with other devices, such as other networks.

The storage device 108 is in communication with other components of the network 102. The storage device is configured to store data in a plurality of databases. These databases include a planned work probable findings database 116, a planned work geography located database 118, a work description library 120, a geography definition database 122, a standard repair library 124, a standard parts list 126, a component part and serial number database 128, configuration databases 130 and possibly other databases 132. The other databases 132 may store ancillary information such as data and applications for use by components such as the server 106 and the user interface 104 of the network. The content and creation of these databases along with their use for scheduling planned and unplanned MRO work will be described in more detail below.

Figure 3:
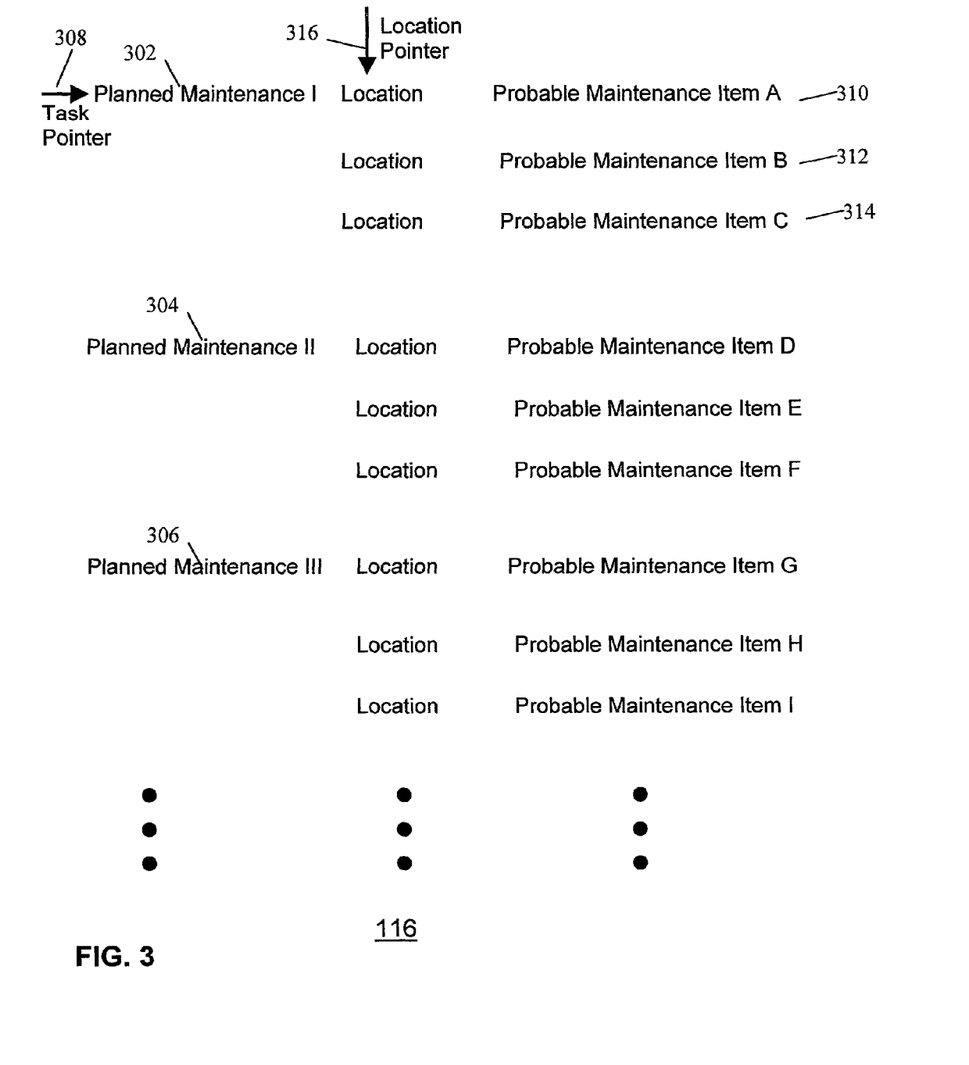
FIG. 3 illustrates one embodiment of a planned work probable findings database of FIG. 1.

MRO work is organized by task. Examples of aircraft MRO tasks are "overhaul engine number 1," or "inspect brake pads on nose landing gear." Many MRO tasks are planned and scheduled according to a regular preventative maintenance schedule or other planning basis. For each planned MRO task, an analysis is performed to determine what types of additional, unplanned MRO work may be found during routine maintenance within the same geographical area of the equipment. Relative probabilities are assigned to those possible work events and the planned work probable findings database 116 is established from that analysis. One example of data organized in a planned work probable findings database is shown in FIG. 3.

Defined categories of MRO work, such as mechanical, electrical, software, etc. are specified along with expected types of tasks relative to that category. For example, plumbing could be expected to have leaks of varying severity, including seepage, pooling, heavy volume, burst pipe, etc. As another example, structural failures could include task types such as corrosion, cracking, fastener loss and bending, etc. For each of these categories and tasks types, standard nomenclature is developed and category/task-type pairs are established. The resulting data is stored in the work description library database 120.

For each unplanned work category/task type pair identified in the work description library database 120, a standard method of repair is established and associated data is stored in the standard repair library database 124. This library, in one embodiment, includes task descriptions, basic required tool listings as well as any special processing notes, skills or certifications required for the task, including safety warnings. This database also includes both schedule span estimates and cost estimates of the effort required to accomplish the standard repair tasks.

For each entry in the standard repair library database 124, a generalized components list of the items forecast to be required to be perform a specified maintenance or repair task is established in the standard repair parts list library database 126. This database may be organized by part numbers or nomenclature or both. In case of a database organized according to nomenclature only, various analysis techniques related to the context of the semantics used to describe the components may be applied to determined proper part applications for the various configurations.

The equipment geography description database 122 stores data related to geographic zones or locations for all maintained areas of the end item of equipment. This may include detailed information about subareas, focused on defining where maintenance work has been located on the end item of equipment. For example, geography must be specified as "right-hand front fender—rear edge" or "left-hand forward wheel well—pump mount side." Only those areas determined to be subject to frequent or expensive maintenance may be listed. Preferably, the geographic location descriptions are related to a user graphical interface allowing for rapid point-and-click data acquisition. That is, a user operating a pointer-type device in conjunction with a display device may find and identify a specific geographic location or zone quickly using a graphical user interface. In instances where industry regulatory entities have pre-established geographic areas or zones or sub-zones, such as the ATA zones specified by the Air Transport Association for commercial aircraft, utilization or cross references may made to those standards in the geographic description database 122. An example of the ATA zones is provided herein as an appendix.

The component part/serial number database 128 stores part numbers or component serial numbers or some other unique tracking number for components of the equipment. The configuration database 130 stores information about the configuration or interrelationship of the components and parts of the equipment. These databases may be accessed for additional information about equipment needing repair or replacement.

While the several databases shown in FIG. 1 and described herein are independent in this embodiment, other data storage embodiments may be used. The data associated with the respective databases may be combined or linked in one or more databases. Databases may be located together as shown or distributed about the network. Any suitable database management tool or applications may be used for managing and maintaining the databases.

The scheduler 110 schedules maintenance for a plurality of maintenance time periods for equipment as part of the operation of the MRO system. As noted above, some MRO work occurs according to a schedule, such as routine preventative maintenance or overhaul work. Some MRO work may be planned but unscheduled, such as repairs. The scheduler 110 tracks work that must be performed over time against a calendar and using information about availability of other resources.

The scheduler 110 is illustrated in FIG. 1 as a computer in communication with the network 102 with access to the storage device 108 including its databases, the server 106 and user interface 104. In other embodiments, the functionality provided by the scheduler 110 may be performed by other components of the system 100. For example, a processor associated with the server 106 may perform the functions provided by the scheduler 110.

The scheduler receives data inputs regarding equipment on which maintenance is to be performed, the maintenance to be performed on the equipment, and resources available to perform the maintenance, such as parts and personnel. The scheduler may also receive other information such as availability of the equipment and planned maintenance schedules for the equipment. Using this information and other required information, the scheduler 110 develops a maintenance plan for maintenance in a selected time period for specified equipment. As will be described in greater detail herein, the scheduler 110 further receives information about unplanned work identified, for example, by a technician during inspection or performance of other work. The scheduler 110 integrates performance of the unplanned maintenance work into the maintenance plan for the equipment.

It is to be noted that other embodiments of the system 100 may be substituted. The functionality provided by the system may be alternately provided by computation and data storage devices having any configuration which is suitable to the needs and purposes described herein. The configuration shown in FIG. 1 is exemplary only and is intended to clarify the function of the various elements of the system described therein.

Figure 2:
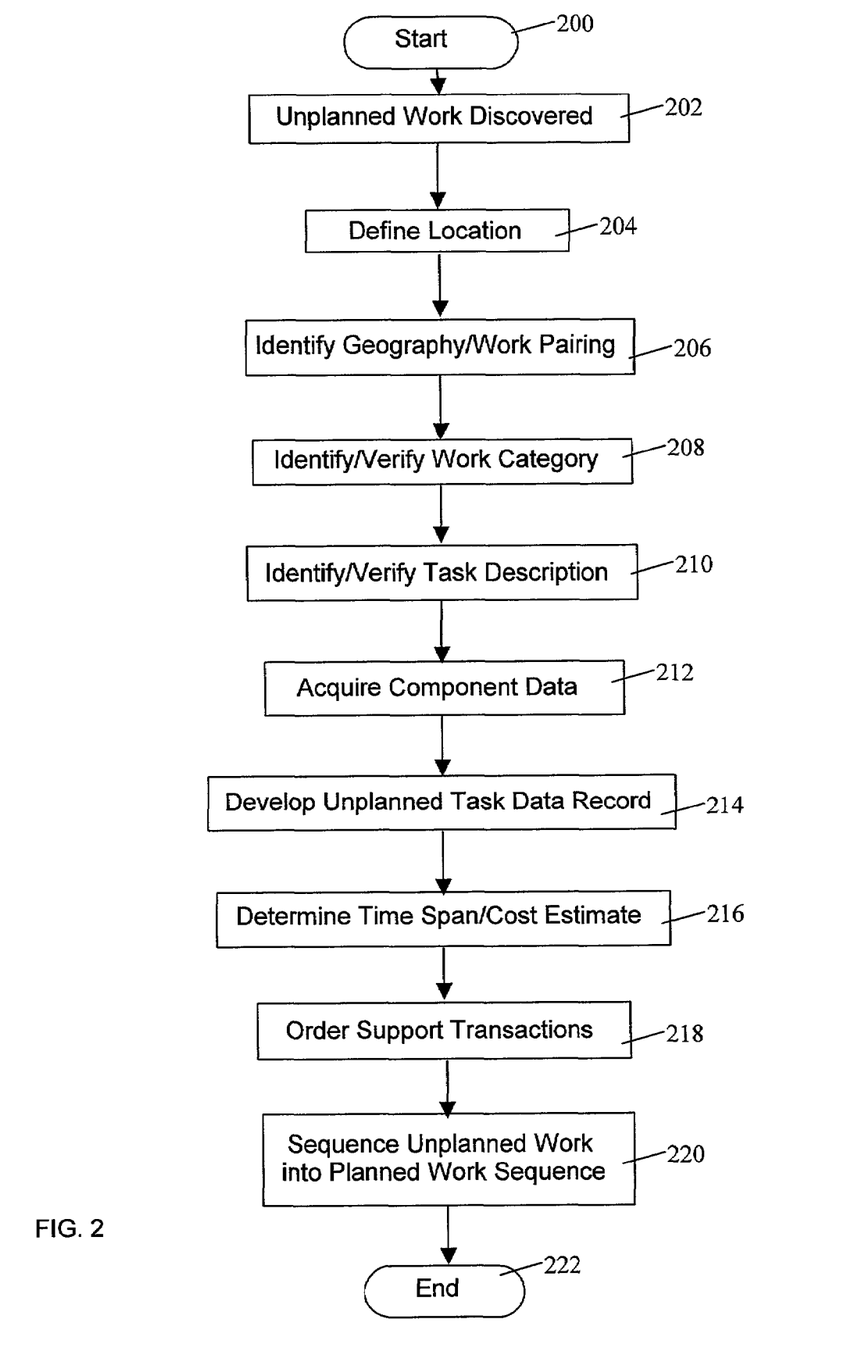
FIG. 2 is a flow diagram illustrating one embodiment of a method of operating the system of FIG. 1.

FIG. 2 is a flow diagram illustrating one embodiment of a method for operating the system 100 of FIG. 1. The method illustrated in FIG. 2 permits identification, categorization and integration of unplanned MRO work in a schedule for completion of planned MRO work. The method begins at block 200.

At block 202, unplanned MRO work is discovered. This may occur at any point in the MRO work process. For example, the unplanned work may be discovered before the equipment is delivered for MRO processing. The MRO work may be discovered while planned MRO work is under way, for example, when the equipment has been opened up for access to a planned work area.

In accordance with one embodiment, for each item of unplanned work discovered, an MRO technician or mechanic utilizes a computer input device to define the location of the work on the equipment. Two techniques for location definition are envisioned, and others may be implemented as well. In one technique, the location of the unplanned work is specified using the most relevant planned work definition, as specified in the probable findings database 116 (FIG. 1), as will be described in greater detail below. Alternatively, the unplanned work can be specified through an assigned MRO geography definition. This definition may be obtained, for example, from the geography definition database 122 (FIG. 1). In the example involving aircraft MRO work, this information may be specified in the format of standard codes and locations for aircraft specified by the Air Transport Association, shown in the appendix hereto. For example, those standard codes may be specified as a default definition database. If other definitions are specified, for example by a specific airline which operates an aircraft, the preferred definitions may be substitute for the standard, default codes and locations.

Preferably, the location definition operation described by block 204 occurs when the technician clicks on an item on a menu. The menu may be presented to the technician by means of the user interface 104 or a device such as the wireless data communication device 112 in communication with the user interface 104. It is envisioned that the user interface will provide an easy to navigate menu system for data entry and access by a technician, mechanic or other operator. The menus are preferably dynamic pop up or pull down menus, with menu selections varying with the context of the menu. Only appropriate menu choices are provided to the user depending on his current context or location in the menu system or level of operation.

At block 206, the operator specifies the geography/work pairing for the unplanned work items. Preferably, this is accomplished using a point and click menu system associated with a user interface. The menu system may be used to access or specify the particular geographical location of the equipment. The menu system may further be used to select or identify a particular item of unplanned MRO work to be completed at the specified geographical location. This task description selection is preferably based on a pull down menu of relevant information only, and a click-to-verify method for input. That is, once the geographical location has been identified by the operator, only the possible work tasks in that geographical location are made available by the menu system. If the operator specifies an area of the assembly where only hydraulic systems are located, only hydraulic work tasks will be displayed by the menu system. Other tasks, such as electrical tasks and airframes repair tasks, will be suppressed.

At block 208, the operator identifies and verifies the work category for the items of unplanned work. Preferably, different tasks are specified in different categories of work. For example, in the airplane repair context, categorization may assign tasks to categories such as hydraulics, electrical, airframe repair, etc. Categorization can be important to allow allocation of proper and necessary resources for completion of the planned and unplanned work. Alternatively, the tasks could be categorized by geography, specifying physical regions of the equipment under repair for categories to which work tasks may be assigned.

At block 210, a task description for the unplanned work tasks is identified and verified. Again, this is preferably accomplished using a pull down menu of relevant information, along with a click-to-verify method for input. Based on the information provided by the technician, the system responds with a pull down menu whose entries are limited to only relevant or proper entries. Irrelevant or improper entries are suppressed.

At block 212, component data is acquired by the system. In one embodiment, this is done by reading a data code from the device. The data code may be machine readable, such as a bar code or magnetic stripe or may be a part number or serial number attached to the device. The data code is a unique identifier of the device. In another embodiment, this is done by posing tailored questions to the operator to obtain the required information. The questions may be posed using a video entry device associated with the user interface of the system or with the wearable communication device. Alternatively, an audio interface may be provided. The questions are tailored to the type of MRO task already identified by the technician. In one example, the following questions may be transmitted to the operator for data entry.

Does the item to be maintained have a digital media (bar code/magnetic stripe, etc.) attached? If yes, input the information by scanning it now.

If no such media identifier exists, input the serial number printed or stamped on the item, or input "no" if none exists.

Should the item be removed for further work, yes/no.

Additional tailored questions may be asked as required.

At this point, the answers to the tailored questions along with other data entered by the operator have provided the system with sufficient information to draw inferences as to the next steps required. Any appropriate or available application may be employed to perform necessary logical operations to process the input information. The system can accordingly initiate required transactions in support of those next steps.

The information provided by the operator and obtained from the storage device of the system allows the system to fully identify and describe the unplanned work task. At block 214, the system establishes an unplanned task data record, which may be located in a portion of memory for storing data related to the unplanned task. At block 216, the system determines a time span/cost estimate for the unplanned task. The time and cost estimates may be based on prior art data or experience performing similar unplanned work. At block 218, the system orders the necessary support for the task.

Examples of required support include components for repair and replacement, information such as directions, and personnel.

At block 220, the unplanned work is sequenced into the planned work sequence to produce a revised work plan. This forms the preparation of an integrated schedule including the original work tasks and the newly discovered tasks. After producing the revised work plan, the method illustrated in FIG. 2 terminates at block 222. Additional or alternate actions may be taken in other embodiments.

It may happen that the system cannot develop the necessary described linkages. In that case, a transaction is produced by the system to a maintenance control area for further analysis or engineering assistance. In all cases, the unplanned work is fully identified, categorized and integrated to the total work plan prior to executing the repair task. This reduces or eliminates the uncertainty and variability formerly associated with unplanned MRO work.

FIG. 3 illustrates one embodiment of the planned work probable findings database. The database 116 is preferably contained on a storage medium such as a hard-disk drive, semiconductor memory or other electronic storage. The storage device or storage medium forms a computer readable equipment maintenance database storage medium. The database includes first data defining planned maintenance items for equipment and second data defining probable maintenance items for the equipment. The second data are associated with the first data by geographic data for the equipment.

In the embodiment illustrated in FIG. 3, the first data are organized as a series of planned MRO tasks 302, 304, 306. A task pointer 308 points to one of their designated tasks. Only three MRO tasks are shown in 302, 304, 306 FIG. 3 but the database 116 may contain any number of tasks. Associated with each planned MRO tasks 302, 304, 306 are one or more probable maintenance items. Thus, associated with a first plan MRO task 302 are a first probable MRO task 310, a second probable MRO task 312, and a third probable MRO task 314. Any number of probable MRO tasks may be associated with each planned MRO task. FIG. 3 is exemplary only.

Linking the planned MRO tasks and the probable maintenance items is location data. The location data defines the physical or geographical location of the equipment where the components associated with the planned maintenance and probable maintenance may be found. The location for respective probable maintenance items associated with a common planned MRO task may vary. A location pointer 316 points to the currently accessed location in the database. Thus, this database may be considered a two-sided database.

Two-way operation of the database 116 may occur as follows. The database may be accessed using any suitable database management system or other user interface. Preferably, in the embodiment of FIG. 1, a pull down menu system is used to display data from the database 116. By pointing and clicking with a pointer-type device, for example, the task pointer 308 or the location pointer 316 may be moved to select different database entries. By specifying a planned MRO task as indicated by the task pointer 308, all probable maintenance items associated with that planned MRO task can be located. Similarly, by specifying a geographic location using the location pointer 316 into the database 116, all planned maintenance such as planned MRO task 302 and probable or unplanned maintenance items such as tasks 310, 312, 314 associated with that location can be identified.

It should be noted that there may be several different location entries which may be associated with a single planned MRO task 302, 304, 306. For example, in the airplane context, if the planned MRO task 302 is described as "inspect air conditioning air ducts," such ducts run the length of the plane, in a plurality of locations. Each separate location may have a separate probable MRO task 312, 312, 314 associated therewith.

The planned work geography locator database 116 can be formed in any suitable method. In one embodiment, this database is formed by identifying a planned MRO task for particular equipment and identifying one or more geographical areas of the equipment associated with completion of the planned MRO task. Subsequently, unplanned MRO tasks are identified which are associated with the one or more geographical areas. For example, a planned MRO task may be identified as "inspect left wing hydraulic lines." The geographical areas for the airplane associated with this MRO task may be identified as the left wing and individual components and spaces thereof. An example of unplanned MRO tasks associated with the one or more geographical areas is "left wing airframe damage" or "worn electrical cables in left wing."

The method for forming the equipment maintenance database further includes storing in a database first data related to the planned MRO task. This data may define, for example, an element or component requiring maintenance and the particular maintenance to be performed. The method further includes storing second data in the database, the second data related to the unplanned MRO tasks which have been identified for the geographical areas associated with the planned MRO task. The method still further includes associating the first data and second data by geographic data related to one or more geographical areas of the equipment. In one example, the geographical data may be data related to the codes established by the Air Transport Association industry organization to define an standard reference characteristic the geographical locations of an airplane. Examples of these codes are included herewith as an Appendix.

Figure 4:
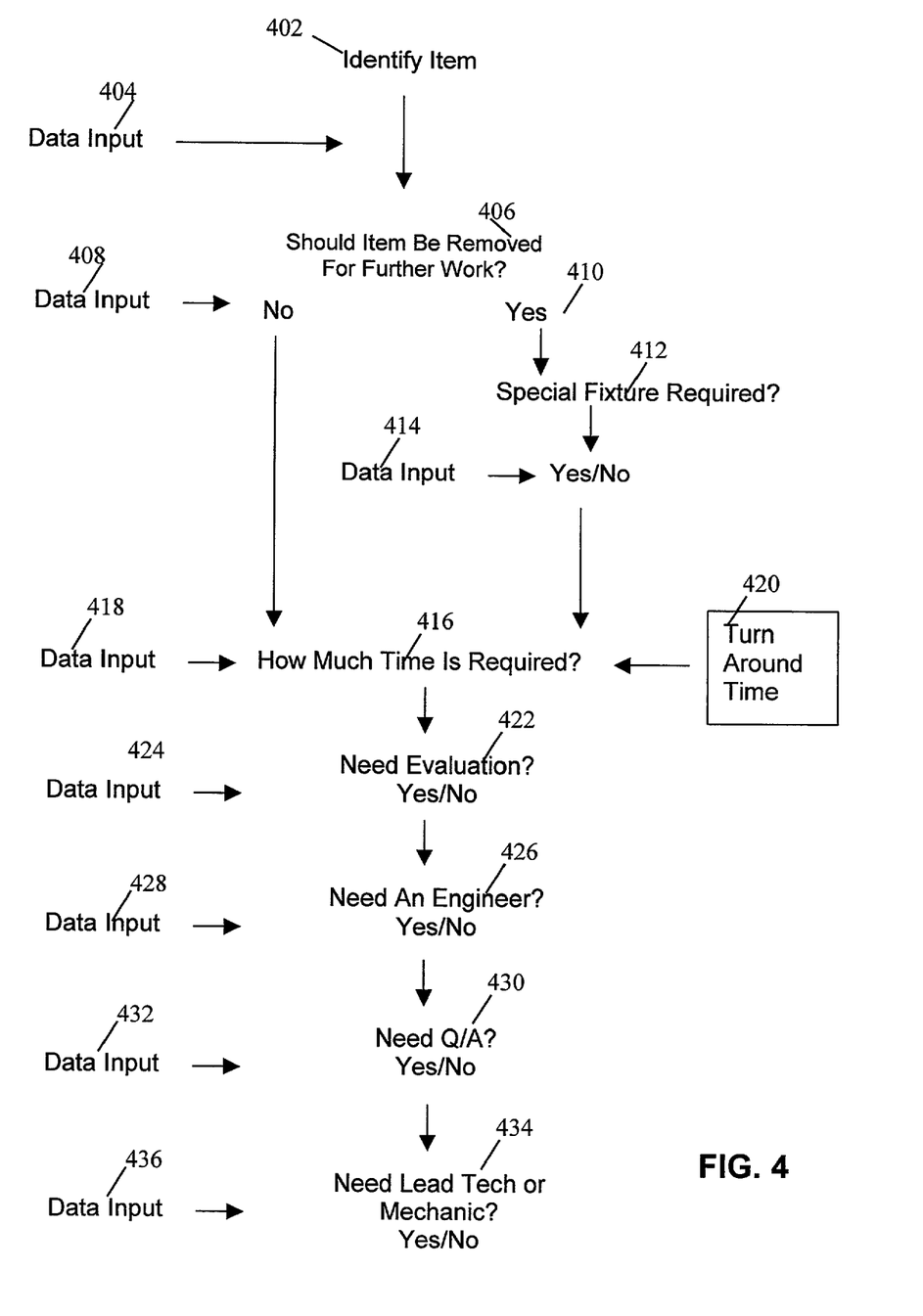
FIG. 4 illustrates a question and response session gathering data to permit integration of unplanned work with a planned work schedule.

FIG. 4 illustrates a tailored question and response session between the system of FIG. 1 and an operator to gather data to permit integration of unplanned work tasks with a planned work schedule. At block 402, the operator is prompted to identify the item for maintenance. At block 404, the data entered by the operator is received. At block 406, the operator is asked if the specified item should be removed for further work. A response input is received at block 408. If a yes response is received, block 410, the operator is asked if a special fixture is required at block 412. A yes or no response is received at block 414.

At block 416, the operator is prompted to enter a required time for completion of the unplanned MRO task. A response is received at block 418. In addition, in one embodiment, external data is also received related to timing and duration of maintenance work. In one example, some airlines specify a very short turnaround time, meaning the duration from arrival of an airplane at an airport gate until subsequent departure of the plane on a next flight from the gate. Some airlines specify a turnaround time of 20 minutes. Other airlines specify a turnaround time of, for example, one hour. This information may be used, in conjunction with the data entered at block 418 to schedule the unplanned maintenance. Thus, if the data entered requires less than one hour for completion, and the turnaround time received at block 420 is an hour or more, the system may conclude that this unplanned work item may be completed during a turnaround process, assuming personnel and the equipment required for the task are available.

At block 422 the operator is prompted for a need for evaluation of the completed work. A response is received at block 424. At block 426, the operator is asked if an engineer is required for completion of the task. A response is received at block 428. At block 430, the operator is asked if quality assurance personnel are required for completion of the work item. A response is received at block 432. At block 434, the operator is asked if a lead technician or mechanic is required for completion of the task. A response is received at block 436.

Other questions may be asked of the operator based on the location and nature of the unplanned work to be performed and based on other information provided in the responses to the questions. The questions may be viewed as a tree, where the branch taken in the tree by the system is dependent upon the input received from the operator. Any number of questions may be generated depending upon the responses provided by the operator. Preferably, the number of questions is limited to the range of six to ten questions which are fairly general in nature for ready response by the operator.

From the foregoing, it can be seen that the present invention provides method and apparatus for identification, categorization and integration of unplanned MRO work in an MRO work schedule. A technician identifies location of the unplanned work and answers tailored questions posed by the system to obtain additional information about the nature of the work. Using this information, the system identifies and describes the unplanned work tasks and modifies the schedule for planned maintenance work to include the identified unplanned work. In this manner, the required components, information, tooling and personnel to perform the tasks, both unplanned and planned tasks, may be scheduled for efficient utilization and completion of the work schedule.

While a particular embodiment of the present invention has been shown and described, modifications may be made. It is therefore intended in the appended claims to cover such changes and modifications which follow in the true spirit and scope of the invention.

APPENDIX

ATA CODES

| | | | |
|---|---|---|---|
| 05 | MTC CHECKS | 22 | AUTO FLIGHT |
| 10 | Time Limit | 10 | Auto Pilot & Flight Director * |
| 20 | Scheduled Checks | | Pitch/Roll/Annunciation |
| 21 | Trans Check | 20 | Speed-Attitude Correction |
| 23 | #1 Layover | | YAW Damp |
| 25 | #2 & ER Layover Checks | | Speed/Mach or Pitch Trim |
| 50 | Unscheduled Checks | | Stability Augmentation |
| | Hard Landing | 30 | AutoThrottle |
| | Turbulent Air | | Thrust Management |
| | Lightning Strike | 40 | System Monitor |
| | Over-weight Landing | | MCDP |
| | Bird Strike | | DLC/Auto Ground Spoilers |
| | Pre-Ferry Inspection | | (L 1011 only) |
| 21 | AIR CONDITIONING | 70 | Aerodynamic Load Alleviating Active Control System |
| 10 | Compression | | |
| 20 | Distribution | 23 | COMMUNICATIONS |
| | Conditioned Air Ducts | 10 | VHF |
| | Lav/Galley Vent System | 20 | VHF and UHF |
| | Recirculation Fan System | | SELCAL |
| | Gasper | 30 | Passenger Address |
| | Equipment Cooling | | and Entertainment |
| 30 | Pressurization | | Audio and Video |
| | Control & Indication | | Tape Recorders |
| | Relief Valves | 35 | Sky Radio |
| 40 | Heating | 40 | Interphone |
| | Cargo Heat | | Cabin and Service |
| | Floor/Foot/Shoulder Heat | 50 | Audio Integrating |
| | Hot Air Manifold Heat | | Flight Interphone |
| 50 | Cooling | | Cockpit Microphones/ |
| | Air Cycle Machine | | Headsets and Loudspeakers |
| | ACM Control & Ind. (ACM Only) | 60 | Static Discharge |
| | | 70 | Voice Recorder |
| | ACM Valves | 80 | ACARS |
| | ACM Controller | 90 | Air to Ground Telephones |

APPENDIX-continued

ATA CODES

| | | | |
|---|---|---|---|
| 60 | Temp. Control | | (Airfone, Satcom) |
| | Zone Temp. Controller | 91 | ARINC 629 |
| | Zone Trim System | 93 | Overhead Panel ARINC |
| | Compartment & Zone Ind. | | System (OPAS) |
| 70 | Humidity Regulation | 94 | Onboard Local Area |
| 73 | Ozone Control | | Network (OLAN) |
| 24 | ELECTRICAL POWER | 27 | FLIGHT CONTROLS |
| 09 | Electrical Load Management System (ELMS) | 02 | Primary Flight Controls |
| | | 03 | High Lift Control System |
| 10 | Generator Drive CSD and IDG | 10 | Ailerons |
| 20 | AC Generation | | Aileron Trim |
| | Generators | | Control Wheel |
| | Generator Control Panels | | Aileron Pos. Indication |
| | Indication (AC) | 20 | Rudder |
| 30 | DC Generation | | Rudder Trim |
| | Transformation Rectifiers | | Rudder Pedals |
| | Battery and Battery Charging | | Rudder Indication |
| | Indication (AC) | 30 | Elevator |
| 35 | Flight Control D/C Power | | Elevator Feel |
| 40 | External Power | | Control Column |
| | Bus Power Control Unit | | Elevator Indication |
| 50 | Electrical Distribution | 40 | Horizontal Stabilizer |
| | Ground Service | | Stabilizer Trim |
| | Utility Buses | | Stabilizer Pos. Indication |
| | Generator/Bus Tie Breakers | 50 | Flaps |
| 25 | EQUIPMENT & FURNISHINGS | | Asymmetry Control |
| | | | Load Relief |
| 10 | Flight Compartment | | Flap Pos. Indication |
| 20 | Passenger Compartment | 60 | Spoilers/Speedbrakes |
| 25 | Cabin Maintenance Visit | | Spoiler Pos. Indication |
| 30 | Buffet and Galley | 70 | Gust Lock |
| | Service Areas | 80 | Leading Edge Lift |
| | Ovens/Chillers/Dispensers | | Augmenting |
| | Carts | | Leading Edge Slats/Flaps or |
| | Elevators or Lifts | | Slots |
| 40 | Lavatories | | Auto Slat Extension System |
| 50 | Cargo and Accessory Compartments | | Asymmetry Control |
| | | | Slat or Flap Pos. Indication |
| | Cargo Loading Systems | 28 | FUEL |
| 60 | Emergency Equipment | 10 | Storage |
| 88 | Cabin Cleaning Operation | 20 | Distribution |
| 26 | FIRE PROTECTION | | Plumbing |
| 10 | Detection | | Pumps |
| | Fire/Overheat or Smoke | | Valves |
| 20 | Extinguishing | 30 | Dump |
| | Fixed or Portable Extinguishers | 40 | Indicating |
| 30 | Explosion Suppression | | Quantity |
| | Fuel System Protection | | Temperature |
| 29 | HYDRAULIC POWER | | Pressure |
| 10 | Main | 32 | LANDING GEAR |
| 20 | Auxiliary | 10 | Main Gear and Doors |
| | Emergency or Standby | 20 | Nose Gear and Doors |
| | RAT | 30 | Extension and Retraction |
| 30 | Indication | | Actuators and Control System |
| | Quantity | | Latches and Locks |
| | Temperature | | Truck Positioning (Tilt) |
| | Pressure | 40 | Wheels and Brakes |
| 30 | ICE & RAIN PROTECTION | | Wheel Assemblies |
| 10 | Airfoil | | Parking Brakes |
| 20 | Air Intakes | 42 | Anti-skid System, Autobrakes |
| | Cowl Anti-icing | 43 | Tire Foreign Object Damage |
| 30 | Pitot and Static | | (Puncture Damage) |
| 40 | Windshields and Windows | 50 | Steering |
| 50 | Antennas and Radomes | 60 | Position and Warning |
| 60 | Propellers/Rotors | | Landing Gear/Supplementary |
| 70 | Water Lines | | Gear and Gear Door Warning |
| | Supply and Drain | | and Indication System |
| 80 | Detection | | Proximity Switch Electronic |
| | Ice Detector and Annunciation | | Unit |
| 31 | INSTRUMENTS | 70 | Supplementary Gear |
| 09 | System Card Files | | Tail Skid |
| 10 | Panels | 33 | LIGHTS |
| 20 | Independent Instruments Clocks | 10 | Flight Compartment |
| | | 20 | Passenger Compartment |
| 30 | Recorders | | Galley and Lavatories |
| | Flight Recorders/FDAU | | Sign Illumination |
| 35 | Aircraft Conditioning | 30 | Cargo and Service |

APPENDIX-continued

ATA CODES

Monitoring System (ACMS)
- 40 Computers
- Engine Indicating Crew Alerting System (EICAS)
- Multi-Acquisition Processor (MAP)
- 41 Airplane Information Management System (AIMS)
- 50 Central Warning
- Aural Warning
- Takeoff/Landing Warning
- 34 NAVIGATION
- 10 Flight Environment Data
- Pilot and Static Systems
- Altitude/Altitude Alert
- A/S and Over-speed Warning
- V/S
- Air Data Computers
- Stall Warning
- Air Temperature
- 20 Attitude and Heading
- Electronic Flight Instrument Systems
- Attitude Indicator Systems
- Magnetic Heading Systems
- Directional and Vertical Gyros
- Turn and Bank
- Standby Horizon
- Air Data Inertial Reference System (ADIRS)
- 30 Landing and Taxi Aids
- ILS and Marker Beacon Systems
- Radio Altimeter System
- Monitor/Comparators
- 40 Independent Position Determining INS or IRU
- Weather Radar
- Ground Proximity Warning System
- "Collision Avoidance (TCAS, Windshear)"
- 50 Dependent Position Determining
- ADF - ATC - VOR
- OMEGA - DME - GPS
- 60 Flight Management
- 35 OXYGEN
- 10 Crew
- 20 Passenger
- 30 Portable
- 36 PNEUMATIC
- 10 Distribution
- Control System
- Ducts
- 20 Indication
- Temp and Pressure (duct)
- 52 DOORS
- 10 Passenger/Crew
- Steps
- Actuation
- 20 Emergency Exits
- Emergency Actuation System
- 30 Cargo
- Doors and Actuation System
- 40 Service
- 50 Fixed Interior
- Flight Compartment
- Lavatory
- 60 Entrance Stairs
- Actuation
- Control and Indication
- 70 Door Warning
- Passenger/Service Accessory Compt. And Stairs Ind.
- Code Landing Gear Doors Under Chp. 32
- 53 FUSELAGE
- 10 Main Frame
- Compartments
- 40 Exterior Lighting
- 50 Emergency Lighting
- Flashlights
- 38 WATER/WASTE
- 10 Portable
- Storage
- Distribution
- Quantity Ind.
- 30 Waste Disposal
- Wash Basins
- Water Closets
- Flushing Systems
- 40 Air Supply
- Tank Pressurization
- 45 CENTRAL FAULT DISPLAY SYSTEM
- 49 AIRBORNE AUXILIARY POWER
- 10 Power Plant
- Mounts
- Fireseals
- Electrical Harness
- Intake
- Drains
- 20 Engine
- Accessory Gearbox
- 30 Engine Fuel and Control
- Electronic Controller
- 40 Ignition and Starting
- Starter
- 50 Air
- Accessory Cooling
- Pneumatic Supply
- 60 Engine Controls
- Emergency Shutdown
- 70 Engine Indicating
- Speed and Temperature
- 80 Exhaust
- 90 Oil
- Storage
- Distribution
- Indication
- 54 NACELLES/PYLONS
- 10 Main Frame
- Pylon/Strut
- Keels
- 30 Plates/Skins
- Access Covers
- 40 Attach Fittings
- Thrust Reverser
- Attach Fittings
- 50 Fillets/Fairings
- Pylon to Wing/Eng Fairing
- 55 STABILIZER
- 10 Horizontal
- Plates/Skin
- 20 Elevator
- Plates/Skin
- Balance Devices
- Tabs
- 30 Vertical
- Plates/Skin
- 40 Rudder
- Plates/Skin
- Balance Devices
- Tabs
- 50 Attach Fittings
- Horizontal and Vertical Stab/Elev and Rudder Component
- 56 WINDOWS
- 10 Flight Compartments
- 20 Cabin
- 30 Door
- 40 Inspection and Observation
- 72 ENGINE
- Bulkheads and Keels
- 20 Auxiliary Structure
- Floors
- Fixed Partitions
- 30 Plates and Skins
- Doublers
- 40 Attach Fittings
- Door/Gear/Wing and Engine Pylon Attach Fittings
- Seat Tracks
- 50 Aerodynamic Fairings
- Fillets
- Radome/Tail Cone
- 57 WINGS
- 10 Main Frame
- Primary Structure
- 20 Auxiliary Structure
- Leading/Trailing Edge
- Wing Tips
- Fairing/Fillets
- 30 Plates/Skin
- 40 Attach Fittings
- Pylon/Control Surface and Landing
- Gear Attach Fittings
- 50 Flight Surfaces
- Ailerons and Tabs
- Spoilers
- Flaps
- Leading Edge Lift Devices
- 71 POWERPLANT
- 03 Foreign Object Damage (FOD)
- 10 Cowling
- Inlet
- Accessory
- Core
- 20 Mounts
- Engine to Pylon
- 30 Fire Seals
- Power Plant Mounted
- 40 Attach Fittings
- Power Plant Accessory Attach
- 50 Electrical Harness
- Wiring Disconnected and Removed with Engine
- 60 Variable Air Intakes
- 70 Engine Drains
- 98 Max Power Takeoff
- MAX Power T/O (L1011-1 and MD 88/90)
- NORM Power T/O (B 767 Domestic W/PW 4060)
- ARTS Fired (MD88)
- 74 IGNITION
- 10 Elect Power Supply Exciter
- 20 Distribution
- Ignition Lead
- Igniter Plug
- 30 Switching
- Ignition Control Circuit
- 75 AIR
- 10 Engine Anti-icing
- Cowl Anti-icing Code Under Chp. 30
- 20 Accessory Cooling
- Ducts and Tubing
- Generator Cooling
- Bearing Cooling
- Ignition Cooling
- Active Clearance Control (Case cooling)
- Turbine Cooling
- 30 Compressor Control
- Variable Stator Vanes
- Bleed Valves
- Actuator (VSV)
- 40 Indication
- 10 Reduction Gear and Shaft (Turbo-prop)
- 20 Air Inlet Section
- Fan Case
- Guide Vanes (Fixed)
- 30 Compressor Section
- Compressor - Front/Intermediate/Rear
- Diffuser Case
- 39 Compressor Stall
- 40 Combustion Section
- Burner Cans
- Combustion Chamber and Ducts
- Case
- 50 Turbine Section
- Turbine Nozzles/Rotors/Cases
- Exhaust Section
- 60 Accessory Drive Section
- Engine Mounted Gearbox
- 70 By Pass Section
- Fan Exist Case
- Air Bleed Manifolds
- 73 ENGINE FUEL & CONTROL
- 10 Distribution
- Pumps
- Filters
- Nozzles
- Valves
- Tubes
- 20 Controlling
- Fuel Control
- Electronic Engine Control (FADEC)
- Thrust Lever Resolvers
- EEC Alternator
- Propulsion Discrete Interface Unit
- 30 Indication
- Fuel Flow
- Fuel Temp
- Engine Pump Fuel Press
- Filter Bypass
- 77 ENGINE INDICATING
- 10 Power
- EPR
- Tachometer (N1/N2/N3)
- Engine Synch
- 20 Temperature
- EGT/TGT
- 30 Analyzers
- Airborne Vibration Monitor
- Electronic Engine Control Monitor
- 78 EXHAUST
- 10 Collector/Nozzle
- 20 Noise Suppressor (exhaust gas noise only)
- 30 Thrust Reverser
- Fan/Turbine Reverser
- Control System
- Indication System
- 79 OIL
- 10 Storage
- Engine Tank
- 20 Distribution
- Engine Lubricating System
- 30 Indication
- Quantity
- Temperature
- Pressure
- Filter Bypass
- 80 STARTING
- 10 Cranking
- Starter System
- 99 MISCELLANEOUS

APPENDIX-continued

ATA CODES

| | | |
|---|---|---|
| Engine Air Control System Indication | Board Forms | |
| 76 ENGINE CONTROLS (Use 2230 for Autothrottles) | | |
| 10 Power Controls | | |
| Levels | | |
| Cables | | |
| Bell Cranks | | |
| Tension Regulators | | |
| 20 Emergency Shutdown | | |
| "Engine ""T"" Handle" | | |
| Shutdown Circuits | | |

The invention claimed is:

1. A method for forming and operating a maintenance database, comprising:
identifying a planned maintenance task on equipment;
storing the planned maintenance task in a database;
identifying a first planned maintenance location area on the equipment associated with completion of the planned maintenance task;
identifying a first unplanned maintenance task associated with the first planned maintenance location area;
identifying a first component location in the first planned maintenance location area for a first component involved with the first unplanned maintenance task;
storing the first unplanned maintenance task in the database;
linking the first unplanned maintenance task and the planned maintenance task in the database with first location data that specifies the first component location; and
implementing multiple maintenance task location paths by:
establishing a task pointer into the database that provides a first path to the planned maintenance task; and
establishing a location pointer into the database that provides a second path through the first location data to both the planned maintenance task and the first unplanned maintenance task.

2. The method of claim 1, wherein
the planned maintenance task is one of multiple planned maintenance tasks stored in the database;
the first unplanned maintenance task is one of multiple unplanned maintenance tasks stored in the database; and
the first location data are part of linking location data in the database that establish location associations between the multiple unplanned maintenance tasks and the multiple planned maintenance tasks.

3. The method of claim 2, wherein implementing the multiple maintenance task location paths further comprises:
pointing the task pointer to a selected planned maintenance task included in the multiple planned maintenance tasks;
pointing the location pointer to a selected maintenance location included in the linking location data;
finding location associated planned maintenance tasks by:
following the selected maintenance location to find the location associated planned maintenance tasks from among the multiple planned maintenance tasks; and
finding location associated unplanned maintenance tasks by:
following the selected planned maintenance task to find first location associated unplanned maintenance tasks, with respect to the selected planned maintenance task, from among the multiple unplanned maintenance tasks, or
following the selected maintenance location to find second location associated unplanned maintenance tasks from among the multiple unplanned maintenance tasks, or both.

4. The method of claim 1, further comprising:
identifying a second unplanned maintenance task associated with the planned maintenance location area;
identifying a second component location, different than the first location component, for a second component involved with the second unplanned maintenance task;
storing the second unplanned maintenance task in the database; and
linking the second unplanned maintenance task and the planned maintenance task in the database with second location data that specifies the second component location.

5. The method of claim 1, further comprising:
identifying a second planned maintenance location area on the equipment also associated with completion of the planned maintenance task;
identifying a second unplanned maintenance task associated with the second planned maintenance location area;
identifying a second component location for a second component involved with the second unplanned maintenance task in the second planned maintenance location area;
storing the second unplanned maintenance task in the database; and
linking the second unplanned maintenance task and the planned maintenance task in the database with second location data that specifies the second component location.

6. The method of claim 1, further comprising:
establishing a library database comprising a work category assigned to the first unplanned maintenance task.

7. The method of claim 1, further comprising:
establishing a library database comprising a work category and task type pair assigned to the first unplanned maintenance task.

8. The method of claim 3, further comprising:
obtaining a work category selection;
filtering the location associated unplanned maintenance tasks based on the work category selection; and
displaying the location associated unplanned maintenance tasks that meet the work category selection, and suppressing display of location associated unplanned maintenance tasks that do not meet the work category selection.

9. The method of claim 3, further comprising:
obtaining a work category selection;
obtaining a task type selection;
filtering the location associated unplanned maintenance tasks based on the work category selection and the task type; and
displaying the location associated unplanned maintenance tasks that meet the work category selection and the task type selection, and suppressing display of location associated unplanned maintenance tasks that do not meet the work category selection and the task type selection.

10. A method for forming and operating a maintenance database, comprising:
storing multiple planned maintenance tasks stored in a database;

storing multiple unplanned maintenance tasks stored in the database; and storing linking location data that establish location associations between the multiple unplanned maintenance tasks and the multiple planned maintenance tasks;

implementing multiple path maintenance task location by:
establishing a task pointer into the database;
pointing the task pointer to a selected planned maintenance task among the multiple planned maintenance tasks;
establishing a location pointer into the database;
pointing the location pointer to a selected maintenance location included in the linking location data;
finding location associated planned maintenance tasks by:
following the selected maintenance location to find the location associated planned maintenance tasks from among the multiple planned maintenance tasks; and
finding location associated unplanned maintenance tasks by:
following the selected planned maintenance task to find first location associated unplanned maintenance tasks, from among the multiple unplanned maintenance tasks, or
following the selected maintenance location to find second location associated unplanned maintenance tasks from among the multiple unplanned maintenance tasks, or both.

11. The method of claim 10, further comprising:
establishing a library database comprising a work category assigned to the first unplanned maintenance task.

12. The method of claim 10, further comprising:
establishing a library database comprising a work category and task type pair assigned to the first unplanned maintenance task.

13. The method of claim 10, further comprising:
obtaining a work category selection;
filtering the location associated unplanned maintenance tasks based on the work category selection; and
displaying the location associated unplanned maintenance tasks that meet the work category selection, and suppressing display of location associated unplanned maintenance tasks that do not meet the work category selection.

14. The method of claim 10, further comprising:
obtaining a work category selection;
obtaining a task type selection;
filtering the location associated unplanned maintenance tasks based on the work category selection and the task type; and
displaying the location associated unplanned maintenance tasks that meet the work category selection and the task type selection, and suppressing display of location associated unplanned maintenance tasks that do not meet the work category selection and the task type selection.

15. A data processing system comprising:
a database storing multiple planned maintenance tasks, multiple unplanned maintenance tasks, and linking location data that establish location associations between the multiple unplanned maintenance tasks and the multiple planned maintenance tasks;
a task pointer operable to point to a selected planned maintenance task among the multiple planned maintenance tasks;
a location pointer operable to point to a selected maintenance location included in the linking location data; and
a processor coupled to the database and operable to:
find location associated planned maintenance tasks by:
following the selected maintenance location to find the location associated planned maintenance tasks from among the multiple planned maintenance tasks; and
find location associated unplanned maintenance tasks by:
following the selected planned maintenance task to find first location associated unplanned maintenance tasks, from among the multiple unplanned maintenance tasks, or
following the selected maintenance location to find second location associated unplanned maintenance tasks from among the multiple unplanned maintenance tasks, or both.

16. The system of claim 15, further comprising a library database comprising a work category assigned to the first unplanned maintenance task.

17. The system of claim 15, further comprising a library database comprising a work category and task type pair assigned to the first unplanned maintenance task.

18. The system of claim 15, where the processor is further operable to:
obtain a work category selection; and
filter the location associated unplanned maintenance tasks based on the work category selection; and
further comprising:
a user interface operable to display the location associated unplanned maintenance tasks that meet the work category selection, and suppress display of location associated unplanned maintenance tasks that do not meet the work category selection.

19. The system of claim 15, where the processor is further operable to:
obtain a work category selection and a task type selection; and
filter the location associated unplanned maintenance tasks based on the work category selection and the task type; and
further comprising:
a user interface operable to display the location associated unplanned maintenance tasks that meet the work category selection and the task type selection, and suppress display of location associated unplanned maintenance tasks that do not meet the work category selection and the task type selection.

20. The system of claim 15, where the multiple planned maintenance tasks include a particular planned maintenance task that extends over multiple planned maintenance location areas.

* * * * *

UNITED STATES PATENT AND TRADEMARK OFFICE
CERTIFICATE OF CORRECTION

| | | |
|---|---|---|
| PATENT NO. | : 7,440,906 B1 | Page 1 of 1 |
| APPLICATION NO. | : 09/946095 | |
| DATED | : October 21, 2008 | |
| INVENTOR(S) | : Wetzer et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1331 days.

Signed and Sealed this

Fourteenth Day of June, 2011

David J. Kappos
*Director of the United States Patent and Trademark Office*